May 8, 1923.
W. F. COTTRELL
1,454,106
SPRING COVER FOR MOTOR CARS OR OTHER VEHICLES
Filed March 2, 1921
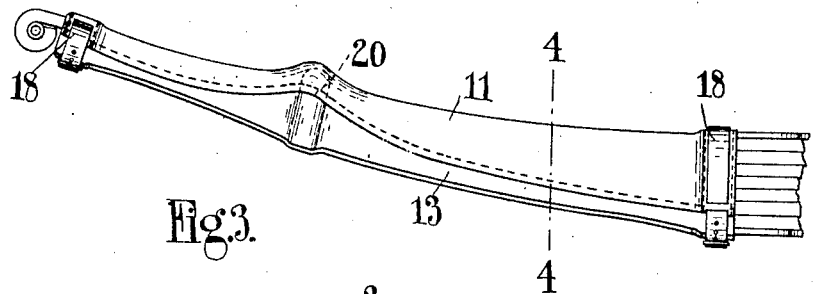
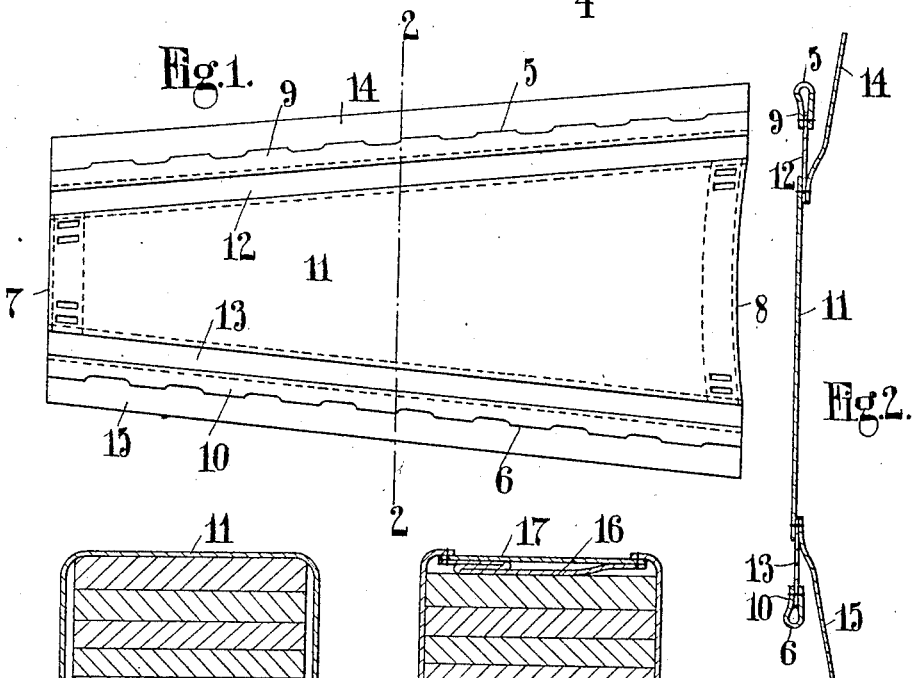
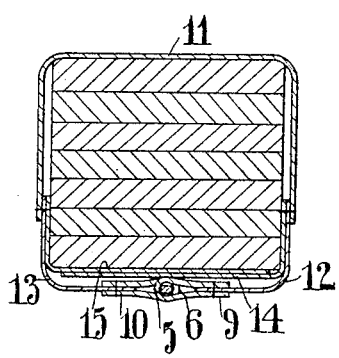
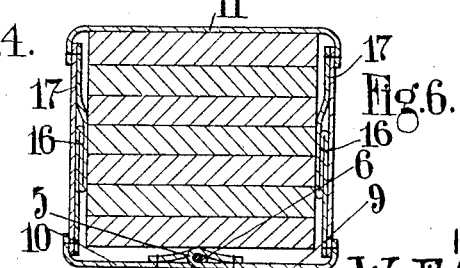
INVENTOR
W. F. Cottrell
BY Marks & Clerk
ATTORNEYS Patented May 8, 1923.

1,454,106

UNITED STATES PATENT OFFICE.

WILLIAM FREDERICK COTTRELL, OF BRISTOL, ENGLAND.

SPRING COVER FOR MOTOR CARS OR OTHER VEHICLES.

Application filed March 2, 1921. Serial No. 449,057.

*To all whom it may concern:*

Be it known that I, WILLIAM FREDERICK COTTRELL, a subject of the King of Great Britain and Ireland, and residing at 667 Fishponds Road, Fishponds, Bristol, in the county of Gloucester, England, have invented a certain new and useful Improvement in the Manufacture of Spring Covers for Motor Cars or Other Vehicles, of which the following is a specification.

This invention relates to gaiters or covers for the laminated springs of motor cars or other vehicles.

More particularly the invention relates to covers for vehicle springs of the type comprising a casing of leather or other suitable material which is divided or split longitudinally and is provided with fastening means whereby the edges of such division or split may be drawn together when the casing is in position on the vehicle spring.

In such spring covers it has been found in practice that in preparing a number of covers identical in dimensions, although they are cut out correctly, it sometimes happens that in stitching the amount of material turned over varies whereby the finished articles may vary slightly. Such slight variation causes difficulties in fitting the covers to the springs, and if the cover is slightly too small the edges of the longitudinal division may not come close enough to prevent the ingress of dirt or the egress of grease.

Another objection found is that the position of the spring guide may vary considerably in identical springs and as it is necessary to shape the cover to take such guide it will be obvious that difficulties will arise by reason of the variable position of the guides.

The object of the present invention is to provide an improved form of gaiter or cover in which the above difficulties are dispensed with.

The invention comprises a gaiter or spring cover having means whereby it may automatically extend or expand transversely.

Preferably the cover is divided longitudinally at one or more places and a strip of elastic material inserted connecting the two parts together.

According to the preferred form, a pair of elastic strips are inserted adjacent to and on either side of the longitudinal fastening.

In order to prevent deleterious action of the lubricating grease on the elastic material, leather tongues may be provided inside the cover which when the cover is in position overlap each other.

In the accompanying drawings,

Figure 1 shows the improved spring gaiter in developed form.

Figure 2 is a section on line 2—2 Figure 1.

Figure 3 is a view of a half spring with the gaiter in position thereon.

Figure 4 is a section on line 4—4 Figure 3.

Figures 5 and 6 are sectional views showing two modifications.

In carrying the invention into effect according to the form shown in Figures 1 to 4, the gaiter or cover is split longitudinally adjacent the fastening edges 5 and 6 which are formed with interengaging loop portions through which a cord, thong or the like passes whereby the edges are drawn tightly against one another. Such longitudinal splits in a cover of the type claimed in my prior United States Patent No. 1,307,657 may extend to the flanges at the ends thereof or as shown to the edges 7 and 8.

The severed or partially severed portions 9, 10, are connected to the main portion 11 by strips of elastic material 12, 13, which may comprise pure rubber but is preferably of textile material having rubber strands interwoven therein.

The elastic material is fastened to the cover in any suitable way, for instance by stitching.

In order to prevent the lubricating grease getting to the elastic material, longitudinal tongues 14, 15, are inserted inside the cover and are of such width that they overlap each other when the cover is in position, see Figure 4.

It will now be understood that in mounting the cover upon a spring any irregularities that may have occurred in making up the cover will be taken up by the elastic material so that if the cover is slightly under size the fastening edge will be pulled together and make a proper joint by an extension of the elastic material.

The fastening may be of any known type such as eyelets and lace, or snap fasteners, but is preferably of the interlocking type shown in my prior United States patent referred to above.

Instead of two elastic strips, only one may be employed.

Among other advantages with the improved gaiter, it is to be observed that with a gaiter according to the invention it is unnecessary to damp it before mounting on the spring as it can be put on perfectly dry. Further, there is no necessity to cut the cover specially to take the spring guide as the elastic material will allow sufficient give to accommodate the guide whatever its position as indicated at 20 in Figure 3.

The only measurements necessary with a gaiter according to the invention are the length and the girth at both ends.

In the cover described it will be understood that the elastic material will come at the lower part of the cover and more or less beneath the spring when in position thereon.

It may, however, be inserted at the top or at the side or sides as shown in Figures 5 and 6 or in any other convenient position.

In such cases only one protecting strip or tongue 16 of leather will be provided for each strip of elastic material 17 and both longitudinal edges of the tongue 16 will be fastened down to the cover, the width of the tongue being sufficient to allow the necessary transverse extension of the cover.

A further advantage with the present cover is that grease may be inserted without taking the cover off the spring merely by loosening the end strap or straps 18 and inserting a screw driver or other tool so as to draw the end of the cover away from the spring.

Having now described my invention what I claim as new and desire to secure by Letters Patent is:—

1. A cover for springs of motor cars and other vehicles comprising a covering member having longitudinal edges, means incorporated in the covering member for permitting variation of the transverse dimension of said member independently of stretching of said member, and means for fastening the longitudinal edges together.

2. A cover for the springs of motor cars and other vehicles comprising a plurality of strips of inelastic material such as leather and alternate strips of elastic material such as rubber fabric connecting such leather strips together and means for fastening the outer longitudinal edges together.

3. A cover for the springs of motor cars and other vehicles as claimed in claim 2, wherein a pair of strips of elastic material are provided which are inserted adjacent to and on either side of the longitudinal fastening edges.

4. A cover for the springs of motor cars and other vehicles as claimed in claim 2 wherein overlapping tongues are provided to cover the elastic strips to prevent lubricant having access thereto.

5. A cover for springs of motor cars and other vehicles as claimed in claim 2 wherein the outer longitudinal edges are provided with interengaging or interlocking loops, and a thong passing through said loops for fastening said edges together.

In testimony whereof I have signed my name to this specification.

WILLIAM FREDERICK COTTRELL.

Witnesses:
GEORGE T. LILLEY,
H. M. VINCENT.